(12) United States Patent
Hansen

(10) Patent No.: US 6,766,963 B2
(45) Date of Patent: Jul. 27, 2004

(54) RECYCLED RUBBER RAILROAD CROSSTIES

(75) Inventor: Steve Hansen, Bakersfield, CA (US)

(73) Assignee: Hansen Rubber Products Inc., Bakersfield, CA (US)

( * ) Notice: Subject to any disclaimer, the term of this patent is extended or adjusted under 35 U.S.C. 154(b) by 0 days.

(21) Appl. No.: 10/275,665

(22) PCT Filed: May 11, 2001

(86) PCT No.: PCT/US01/15296
§ 371 (c)(1),
(2), (4) Date: Nov. 7, 2002

(87) PCT Pub. No.: WO01/88270
PCT Pub. Date: Nov. 22, 2001

(65) Prior Publication Data
US 2003/0205626 A1 Nov. 6, 2003

Related U.S. Application Data
(60) Provisional application No. 60/204,342, filed on May 15, 2000.

(51) Int. Cl.⁷ ............................................. E01B 21/04
(52) U.S. Cl. ............................... 238/84; 238/85; 525/93
(58) Field of Search ..................... 238/84, 85, 106, 238/83, 95, 29, 30, 45, 28, 57; 525/240, 245, 2; 29/460

(56) References Cited

U.S. PATENT DOCUMENTS

| | | | | |
|---|---|---|---|---|
| 730,059 A | * | 6/1903 | Van Tassel et al. | 238/79 |
| 1,074,014 A | * | 9/1913 | Proctor | 238/76 |
| 1,209,477 A | * | 12/1916 | Muse | 238/79 |
| 2,853,742 A | * | 9/1958 | Dasher | 521/45.5 |
| 5,104,039 A | * | 4/1992 | Oestmann | 238/106 |
| 6,179,215 B1 | * | 1/2001 | Shea | 238/29 |
| 6,191,228 B1 | * | 2/2001 | Nosker et al. | 525/240 |
| 6,247,651 B1 | * | 6/2001 | Marinelli | 238/84 |
| 6,262,175 B1 | * | 7/2001 | Jury et al. | 525/93 |

* cited by examiner

*Primary Examiner*—Frantz F. Jules
(74) *Attorney, Agent, or Firm*—Ralph D. Chabot

(57) ABSTRACT

A method for the manufacture of a railroad crosstie (90) from recycled rubber is disclosed. The rubber crosstie (90) has an expected life of between 30 to 60 years and can be made primarily of rubber crumbs obtained from stockpiles of discarded rubber tires. A feature of the invention is to produce a crosstie (90) having at least one longitudinal side incorporating a plurality of indentations for more effective engagement upon installation into a gravel bed to avoid slippage.

9 Claims, 1 Drawing Sheet

FIG. 1
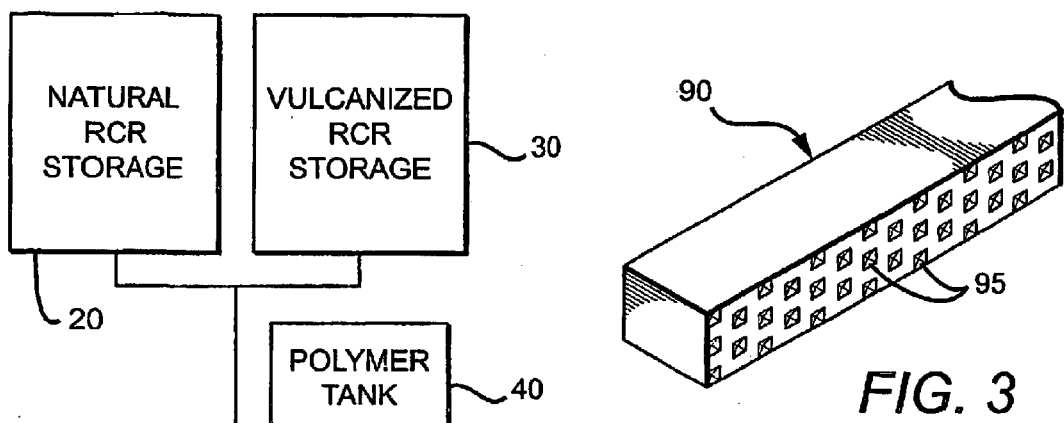
FIG. 3
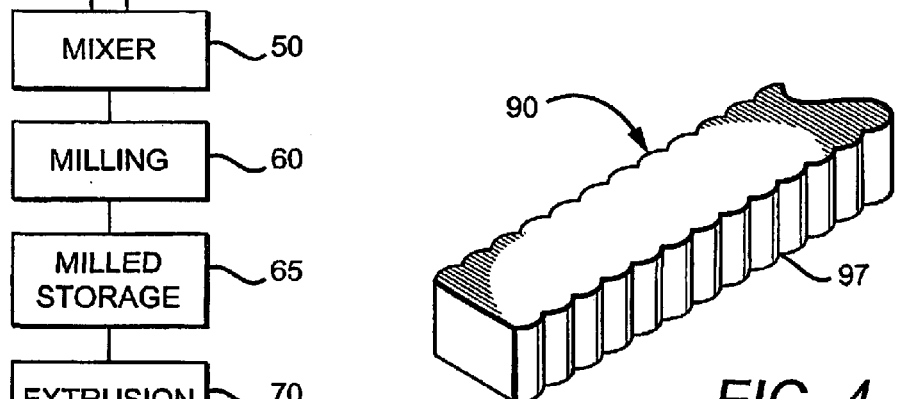
FIG. 4
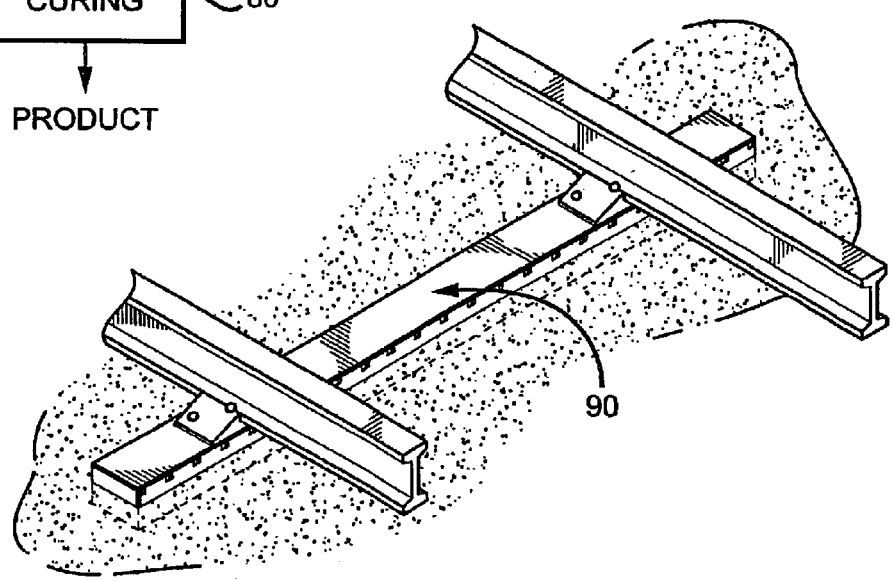
FIG. 2

RECYCLED RUBBER RAILROAD CROSSTIES

CLAIM OF PRIORITY

This application claims priority to U.S. provisional application filed May 15, 2000 bearing Ser. No. 60/204,342.

TECHNICAL FIELD

The invention relates to railroad rail support systems, specifically railroad crossties or ties, and their method of manufacture.

BACKGROUND ART

The majority of railroad track today is comprised of wooden crossties, sometimes referred to simply as ties, for alignment and support of iron rails placed thereupon. However, for a variety of reasons, such as the use of lower quality pine rather than oak due to high timber costs, alternatives to wooden crossties have become available to the railroad industry.

These alternative products can be either made of new or recycled materials. Cement, reinforced concrete, metal, recycled wood, plastic, composites of various recycled materials, and other products have been made. A relatively new approach has been to produce a tie from cement having an iron center and encased within recycled rubber and/or recycled plastics.

These alternative products suffer from one or more significant drawbacks. The railroad industry is seeking an economical alternative to wood. Drawbacks encountered with cement and reinforced concrete is that although durable, they weigh substantially more than ties made from wood. Transportation costs are higher and handling is more difficult because of the increased weight. Ties made with a metal core must also be encapsulated with a non-conductive material for safety and operational concerns. Encapsulation is an additional step which increases the cost of the tie.

Another significant drawback to these alternative crossties is the relatively low force required to withdraw a spike driven into the tie. It is highly desirable to have a higher withdrawal force. A higher withdrawal force translates into a more secured spike and reduces or eliminates the need to reset a spike.

Additionally, almost all alternative tie products have increased noise levels as trains pass due to the surface hardness and steel, cement and plastic cross ties also tend to undesirably shift in the gravel bed.

As a consequence, demand from the railroad industry for non-wood ties has been low. It is believed that high demand would exist if a tie could be made for low-cost, have similar performance characteristics, and have a longer life than a wood tie.

In the recycle and rubber tire industries, there has been a concern for many years regarding what to do with discarded tires. A problem facing these industries has been how to recycle discarded rubber products, and especially vehicular tires into useful and economical end products. More information on the various problems relating to the disposal and recycling of discarded tires is provided in the background sections of U.S. Pat. No. 4,726,530 (Miller et. al.) and U.S. Pat. No. 5,094,905 (Murray).

Technology exists for discarded rubber tires to be recycled. Tires are generally comprised of rubber, steel belts and beads, and fiber such as rayon, nylon, and other polyesters. Present technology can shred and granulate tires and have the metal separated magnetically, and the fibers removed by vacuum. The rubber can be shredded or ground into any desired size. This technology is described in the Miller et. al. patent cited earlier. Utilizing separation technology, discarded rubber tires are available as a source for recycled products.

As mentioned earlier, another problem facing the railroad industry is the useful life or longevity of a crosstie before it requires replacement. This concern is even more prevalent today than in the past. Presently in the United States, crossties are mostly made from softwoods such as pine rather than hardwoods such as oak. Softwood crossties do not have the longevity of hardwoods. As an example, softwood crossties are susceptible to accelerated deterioration in high moisture environments. A tie in a swamp area may have an operational life expectancy of only three to four years. It is believed that the railroad industry would be receptive to more durable alternatives to wood where cost savings can be realized.

DISCLOSURE OF INVENTION

A method to manufacture railroad crossties from discarded rubber has been developed. The rubber railroad tie can be used as wood tie replacements for new and re-laid tracks. The rubber railroad tie can be made economically and utilize the abundant supply of discarded rubber tires stockpiled at waste disposal sites. A functional new design is disclosed which increases the frictional contact between the crosstie and a gravel bed to prevent undesired crosstie movement.

SUMMARY OF INVENTION

The rubber railroad crosstie made according to the invention ("Tie") is made by a process which heats granulated recycled rubber (sometimes referred to as crumb rubber, rubber dust, or rubber fines), preferably not larger than 30 mesh (590 microns). The heated rubber is preferably milled and then extruded to obtain the desired width and depth and thereafter cut to the desired length.

Recycled crumb rubber (RCR) can be made from discarded tires commonly available at waste disposal facilities. RCR can be made available by type and mesh size.

My invention requires two specific types of RCR. The first type is made from vulcanized rubber. The primary source for vulcanized rubber is from automobile and truck tires. The primary source for the second type is from tires classified as natural rubber or rubber which has been de-vulcanized. Natural rubber tires are mostly off-the-road (OTR) tires, which have less sulfur and zinc content than vulcanized rubber, and have a lower melting point. It is to be understood that there may exist some vulcanized rubber in natural rubber tires. However, the tire industry recognizes this fact and the "natural rubber tire" designation is understood to include some small percentage of vulcanized rubber.

Air pollution is not a concern during the process. The preferred milling and extrusion temperature is between 290–310 degrees F. (143–154 deg C.). At this temperature range, there are no significant amounts of toxic or hazardous gases escaping into the production area or environment. Waste tires and rubber crumbs are not generally classified as hazardous materials; but rather as a waste management disposal problem.

Besides discarded rubber, small additions of polymers may be used in the manufacturing process for strength enhancement. The amount necessary will be dependent upon the actual rubber composition used to form a Tie according to my invention.

It is also possible to produce a rubber railroad crosstie which, in addition to the rubber mentioned above, utilizes the fiber also found in vehicular tires. In other words, a crosstie may be formed using discarded automobile tires provided the steel has been removed.

The Tie can be made by either a compression mold or an extrusion process. The operating pressure for extrusion is dependent upon several factors including the viscosity, screw speed and orifice size. In general, an extrusion process operating between 240–370 degrees F. (116–188 deg C.) should operate in a pressure range of between 250–2,500 psi (1,724–17,240 kPa). Due to the logistical problems associated with a high volume compression mold process, it is more preferable to utilize a continuous extrusion process.

Once formed, the color of the Tie is black. Over time, the surface will oxidize and may turn to an ashen black or gray. Testing has indicated that the Tie is not subject to the level of cracking and product degradation under sunlight as occurs for rubber tires.

My railroad tie is made completely from non-conductive materials. Therefore, no special precautions are necessary as with other ties partially made from metals and which could conduct electricity.

Ties can be manufactured into any length desired and are recyclable.

Creosote, a known carcinogen commonly used in the manufacture of wooden railroad crossties, is not used in the manufacture of the Tie.

The weight of the Tie made according to the invention is, on average, between 13% to 50% less per unit when compared to other railroad tie alternatives to wood. By way of example, for a standard railroad crosstie measuring 8.5 ft×9 in×7 in (259 cm×23 cm×18 cm), a crosstie made according to the invention would weigh approximately 278 pounds (126 kg), while one made from concrete would weigh over 500 pounds (227 kg).

A key feature of the Tie is that it can withstand a 120,000 pound (54,480 kg) compression test upon an area equivalent to a standard railroad tie plate of approx 96 square inches (619 sq. cm) Additionally, after the load was removed, no permanent deformation was visible.

The Tie is expected to have a useful life of between 30 to 60 years. The longevity of the Tie will reduce the frequency of crosstie replacement as well as the associated cost for installation.

The Tie can be installed side-by-side a wooden railroad tie. This is in contrast to cement ties and other known alternative crossties where it is recommended that whole-lines be replaced even though only some ties require replacement.

The Tie is designed for attachment in the same way as wood ties. The preferred method is by use of spikes while clips or screws could be used alternatively. The type of attachment would depend on railroad industry preferences for the specific locale in which the track is laid. No new placement or replacement technologies or techniques are required.

Because the Tie is compressed upon formation, further compressive deformation following installation will be minimal. This will permit true alignment during installation. Other crosstie products, including those made from softwoods, have allowances for compression over time to fit the standard rail attachment plates as needed and to grip the gravel under-base or bed.

An optional and unique feature is that the Tie can be made with at least one side having a plurality of indentations or indented surfaces. As used in this specification, "indented surface" and "indentation" have the same meaning and are defined here as a non-flat surface. When a plurality of indentations are present on at least one longitudinal side of a crosstie, they collectively are capable of frictionally engaging a bed of gravel better than if the longitudinal side were a flat surface. The indentations must be something more than microscopic deformations which are present on any flat surface; they must be capable of frictional engagement with a gravel bed to prevent the crosstie from slipping or sliding as would be the case if the surface were flat. "Indentation" is also defined to include configurations such as ribs, serrations, dimples, and other simple geometric shapes such as diamonds and pyramids which can be indented into the crosstie.

In order to function properly, the indentations must be of sufficient width to permit gravel to enter the concave area. If the indented width were too small, excessive void spaces would form in the concave area and therefore not efficiently frictionally engage the gravel bed.

The decision of whether to incorporate indented surfaces would depend upon the use of the Tie. By way of example, if the Tie were used in high speed rail lines, a gravel bed is not used but rather the crossties are positioned on a hardened surface such as cement. A crosstie having indentations is undesirable in this situation since it would reduce the surface area in contact with the hardened surface thereby reducing frictional engagement.

Where gravel beds are to be used, preferably, one side of the Tie has a plurality of indentations which would face downward when laid. Most preferably, three longitudinal sides of the Tie would utilize indented surfaces. The longitudinal side facing upward when laid need not.

The purpose of having indentations on the Tie is to allow it to better frictionally engage the gravel bed into which it is placed. The depth of each indentation should be limited so as to not affect the structural properties of the Tie; namely, the ability to resist compressive loads.

The indented surfaces will enable the crosstie to resist sliding in the gravel bed as can be the case when aligning crossties having harder and smoother surfaces such as those made from wood, plastic or cement.

The indentations can be formed while the Tie is still hot and receptive to deformation. Alternatively, a Tie which is compression molded can have ribbed sides integrated as part of the mold pattern. Still another way for creating the indentations would be by machining; however this procedure would be expensive in view of the other methods previously discussed.

By way of example, the mechanical properties of a Tie made according to the invention are as follows:

| | | |
|---|---|---|
| Density: | 74.8 lbs/ft$^3$ | (1200 kg/m$^3$) |
| Thermal expansion coefficient: | 0.005% per deg F. | (0.003% per deg C.) |
| Modulus of rupture: | 26,982 psi | (186,041 kPa) |
| Modulus of elasticity (bending): | 6,717,000 psi | (46,313,715 kPa) |
| Modulus of elasticity (compression): | 174,144 psi | (1,200,723 kPa) |

-continued

| | | |
|---|---|---|
| Limit of elasticity: | 487,584 psi | (3,361,892 kPa) |
| Hardness: | 924 lbs/in | (165 kg/cm) |
| Pressure to insert spike: | 4,200 psi | (28,959 kPa) |
| Pressure to withdraw spike: | 3,360 psi | (23,167 kPa) |
| Life expectancy: | 30–60 years | |
| Weight load capacity (per Tie): | 521,000 lbs | (236,534 kg) |

Given that extrusion will yield a crosstie with the above mechanical properties, other applications are possible for this sort of extruded rubber product. By way of example, a crosstie pad, made according to the process described herein, could be positioned between a crosstie and its underbed for train travel noise reduction, and shock absorbency when used in conjunction with either steel, cement or concrete crosstie.

BRIEF DESCRIPTION OF DRAWINGS

The details of the invention will be described in connection with the accompanying drawings in which FIG. 1 is an overall process flowchart for the manufacture of a rubber crosstie;

FIG. 2 is a perspective view of an installed crosstie, made according to the invention;

FIG. 3 is a perspective view of a portion of a crosstie made according to the invention having pyramid indentations along at least one longitudinal side and FIG. 4 is a perspective view of a portion of a crosstie, having an alternative type of indentation, namely a plurality of ribs.

BEST MODE FOR CARRYING OUT THE INVENTION

FIG. 1 is a flowchart representing the preferred process for manufacturing a rubber railroad crosstie. The preferred method of producing a rubber crosstie is by extrusion.

RCR is either made on-site from readily available tire stockpiles or is provided from an off-site source. The technology for reducing tires to rubber crumb is described, as previously mentioned, in the U.S. Patents issued to Murray and Miller et al. The required RCR size should be no larger than 30 mesh (590 micron). RCR made from both natural rubber and vulcanized rubber is required and are stored separately and identified in FIG. 1 as 20 and 30 respectively.

The mesh size is vital to the cohesive properties of the tie. A smaller mesh size enables uniform heating and a stronger bond due to each particle having a larger surface area. Natural rubber has a lower melting point and is more adhesive than vulcanized rubber and it is this natural rubber portion which provides the adhesive quality necessary to mill and extrude the Tie. It is however possible to have a small portion of the overall blend be of a larger size than 30 mesh (590 micron). Small quantities of larger size particles may exhibit acceptable performance characteristics.

Referring to FIG. 1, the RCR made from natural rubber and vulcanized rubber is blended together in a mixer 50 at a weight ratio of about between 10–35% natural rubber to 65–90% vulcanized rubber. Mixer 50 can be a batch mixer or a continuous flow mixer. Preferably, a continuous flow Banbury mixer is used.

An appropriate amount of polymer is added to mixer 50 from polymer tank 40, if necessary, to achieve a desired adhesive consistency. Polymer is preferably added by spray and the amount to add to the rubber blend should not exceed 0.25% to 0.50% of the total weight. Appropriate polymer additives can include neoprene, polyethylene, urethane and ABS.

The amount of polymer to be added is dependent upon periodic testing. Specifically, representative samples of natural rubber crumbs and vulcanized rubber crumbs which are to be made into crossties are periodically mixed at between 240–370 degrees F. (116–188 deg C.) and formed into an ingot by using a compression mold. Once sufficiently cooled, the ingot is subjected to a compression test. As an example, ingots have been cooled to a surface temperature of 100 deg F. (57 deg C.) before the test. If the test obtains a value below 6,800 psi (46,886 kPa), then additional natural crumb rubber is added to the blend. However, if the percentage of natural crumb rubber is near 35% and the compression test is below 6,800 psi (46,886 kPa), then polymer is added. The addition of polymer is preferably only used as a last resort to obtain the desired compression strength; mainly due to its high cost.

Since this process is utilizing recycled rubber, it is not feasible to obtain an accurate chemical composition of the feedstock. In other words, a facility which processes discarded tires into RCR will be shredding thousands of tires made in different years by dozens of tire manufacturers. A practical way to ensure that the proper RCR blend for extruding my Tie is to perform the periodic compression testing mentioned above.

The actual process for manufacturing crossties according to my invention is as follows:

Subsequent to the blending in mixer 50, the rubber crumb blend, including polymer if necessary, undergoes a milling process 60 using preferably a roller mill which heats the rubber blend to between 240–370 degrees F. (116–188 deg C.) and compresses the heated mixture into strips to form feedstock for the extrusion step to be discussed shortly. Most preferably, the temperature is held between 290–310 degrees F. (143–154 C).

Milling process 60 is followed by extrusion 70. Depending upon the relative outputs between milling 60 and extrusion 70, the milled product may be placed in storage 65 for a short period of time before extrusion.

During extrusion 70, the temperature is preferably maintained within the same range mentioned above for the milling process. The desired pressure range for extrusion is between 250 to 750 psi (1,724–5,171 kPa). Screw type extruders are preferred.

A die is selected which will provide an extrudate having the desired width and height for the Tie product. As the product exits the extrusion process, 70, it has the desired height and width and is cut to the desired length of crosstie.

No special quenching is required and the rubber crosstie can be cooled/cured 80 by ambient temperature. After the Ties have been cooled, they are ready for storage and shipping. A problem may occur if the rubber crossties are immediately exposed to ambient conditions which are at or below 32 degrees F. (0 deg C.). The physical properties, specifically compression strength, may be jeopardized if the Tie is cooled too quickly. Therefore, gradual cooling may be required if outside conditions are excessively cold and this cooling may require the use of a heated room.

A recommended approach is to place extruded Ties into a curing room 80 or area for a period of time such as between one to four hours. This will permit the Ties to cool at a slow rate and the heat dissipated by the Ties will actually heat the room; particularly when cold conditions are present outside.

When the Ties reach a temperature of below 150 degrees F. (66 deg C.), they can be moved for storage or transport.

The extrusion process can be adapted to indent or deform the longitudinal sides of the product so as to produce a crosstie 90 having a plurality of indentations such as the ribbed sides 97 illustrated in FIG. 4. Alternatively, FIG. 3 is a partial view of crosstie 90 having pyramid indentations 95. The indented surfaces can be made by machine cut. However, the indentations can be formed into crosstie 90 while it is still deformable. Preferably, as part of the extrusion step, at least one offset roller (not shown) can be used to form the plurality of indentations such as serrations or dimples into the crosstie. Indentations can be formed three sides; namely the side which will become the bottom side when the crosstie is installed as well as the two adjacent longitudinal sidewalls.

The plurality of indented surfaces provide improved frictional engagement with a gravel bed during crosstie installation thereby avoiding the inherent difficulties of slipping or sliding upon the gravel bed which occur with other crossties during positioning and alignment. Frictional engagement is not necessary for the topside and may hamper proper attachment of the plate to the tie. Therefore, indentations are not recommended for the topside. FIG. 2 illustrates a final installed position for a crosstie 90.

I claim:

1. A method for producing a crosstie made substantially from recycled rubber comprising the steps of:
   providing vulcanized recycled crumb rubber and natural recycled crumb rubber;
   mixing by weight 10–35% said natural recycled crumb rubber and 65–90% said vulcanized crumb rubber to form a blend; and adding a strength enhancing polymer to said blend, the amount of polymer to add is between 0.0–0.5% of the total weight of said blend;
   milling said blend at between 240 degrees F. and 370 degrees F. (116–188 deg C.) to form an intermediate product;
   extruding said intermediate product at between 240 degrees F. and 370 degrees F. (116–188 deg C.) to form an extrusion having a specific width and depth; and,
   thereafter cutting said extrusion at intervals to yield the croestie having the desired length.

2. The method of producing a crosstie according to claim 1 wherein said strength enhancing polymer is selected from the group comprising neoprene, polyethylene, urethane and ABS.

3. The method of producing a crosstie according to claim 1 further including a means to form a plurality of indentations in at least one side of said extrusion.

4. A crosstie made by an extruder from recycled rubber comprising:
   A crosstie made entirely of an extrusion containing a blend of substantially no larger than 30 mesh (590 microns) recycled natural crumb rubber and recycled vulcanized crumb rubber in a weight ratio of between 10–35% recycled natural rubber to 65–90% recycled vulcanized rubber and a strength enhancing polymer selected from the group comprising neoprene; polyethylene, urethane, and ABS, where said extrusion exits the extruder at a temperature of between 240–370 degrees F. (116–188 deg C.).

5. The recycled rubber crosstie of claim 4 wherein said crosstie has at least one longitudinal side has a plurality of indentations.

6. A crosstie made from recycled rubber comprising:
   an extruded crosstie substantially made from a blend of recycled natural crumb rubber and recycled vulcanized crumb rubber where said crosstie comprises a weight ratio of between 10–35% recycled natural rubber and 65–90% recycled vulcanized rubber and where said crosstie further includes a strength enhancing polymer selected from the group comprising neoprene, polyethylene, urethane, and ABS.

7. The recycled rubber crosstie of claim 6 wherein said crosstie has at least one longitudinal side has a plurality of indentations.

8. A crosstie made from recycled rubber comprising:
   a crosstie substantially made from a blend of recycled natural crumb rubber and recycled vulcanized crumb rubber where said crosstie comprises a weight ratio of between 10–35% recycled natural rubber to 65–90% recycled vulcanized rubber and a strength enhancing polymer selected from the group comprising neoprene, polyethylene, urethane, and ABS where said blend is subjected to a sufficient temperature and pressure to form said crosstie.

9. The recycled rubber crosstie of claim 8 wherein said crosstie has at least one longitudinal side has a plurality of indentations.

* * * * *